United States Patent
Alfonseca et al.

(10) Patent No.: US 9,881,077 B1
(45) Date of Patent: Jan. 30, 2018

(54) RELEVANCE DETERMINATION AND SUMMARY GENERATION FOR NEWS OBJECTS

(71) Applicant: Google Inc., Mountain View, CA (US)

(72) Inventors: Enrique Alfonseca, Horgen (CH); Yasemin Altun, Zurich (CH); Massimiliano Ciaramita, Zurich (CH); Jean-Yves Delort, Dübendorf (CH); Ekaterina Filippova, Zurich (CH); Thomas Hofmann, Wollerau (CH); Evangelos Kanoulas, Zurich (CH); Ioannis Tsochantaridis, Zurich (CH)

(73) Assignee: Google LLC, Mountain View, CA (US)

( * ) Notice: Subject to any disclaimer, the term of this patent is extended or adjusted under 35 U.S.C. 154(b) by 494 days.

(21) Appl. No.: 13/962,705

(22) Filed: Aug. 8, 2013

(51) Int. Cl.
*G06F 17/30* (2006.01)

(52) U.S. Cl.
CPC .... *G06F 17/30705* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 8,126,865 B1* | 2/2012 | Bharat et al. | 707/706 |
| 2002/0032693 A1* | 3/2002 | Chiou et al. | 707/500 |
| 2006/0041597 A1* | 2/2006 | Conrad et al. | 707/200 |
| 2011/0145235 A1* | 6/2011 | Lei | G06F 17/30241 707/730 |
| 2012/0084292 A1* | 4/2012 | Liang | G06F 17/30899 707/741 |
| 2012/0330938 A1* | 12/2012 | Lee et al. | 707/723 |
| 2012/0330968 A1* | 12/2012 | Lee et al. | 707/748 |
| 2013/0110868 A1* | 5/2013 | Hatakeda | G06F 17/30867 707/769 |
| 2013/0290232 A1* | 10/2013 | Tsytsarau | G06N 99/005 706/46 |
| 2015/0006512 A1* | 1/2015 | Alfonseca et al. | 707/722 |
| 2015/0046436 A1* | 2/2015 | Li | G06F 17/3053 707/723 |

* cited by examiner

*Primary Examiner* — Christopher J Raab
(74) *Attorney, Agent, or Firm* — Patent Law Works LLP

(57) ABSTRACT

News documents from one or more sources are aggregated. The news documents are grouped into a plurality of news collections. Each of the news collections includes a sub-set of the news documents having related content. Objects described by the news collections are determined. The objects collectively form a set of objects. A relevance of each of the news collections is measured with respect to the objects respectively described by the news collections and one or more news collections are determined from the plurality of news collections to be associated with a first object included in the set of objects based on the relevance of the one or more news collections to the first object.

21 Claims, 10 Drawing Sheets

Search

Dog 🔍

Entity Chronology

Showing news from January 1st, 2008

» Show/hide all summaries

[Timeline chart showing Volume from 2010–2013, marked September 16, 2010]

Any time
Past 3 months
Past 6 months
Past year

Top 10 events
Top 20 events
Top 50 events
Top 100 events

» May 31, 2013
Man charged in beating death says dog was very ill

» May 8, 2013
Today's most popular Dog breeds

» April 3, 2013
$11000 reward for Dog turned down

» March 4, 2013
Dog rescued from drain pipe

» December 7, 2012
Dog shot with an arrow at close range

Dog
The domestic dog, is a subspecies of the gray wolf, a member of the Canidae family of the mammalian order Carnivora. The term "domestic dog" is generally used for both domesticated and feral varieties.

Figure 6B:
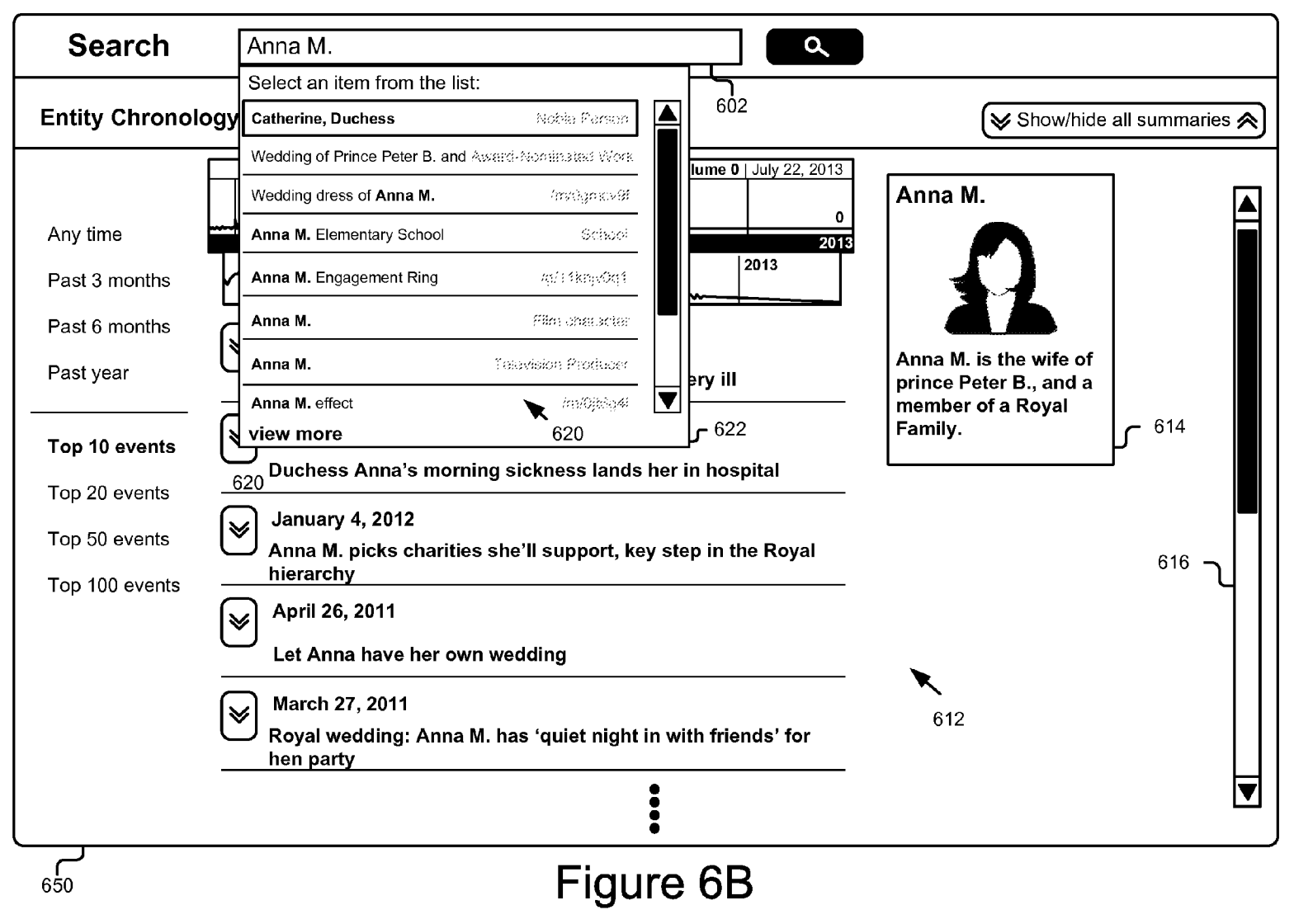

Search: Anna M.

Entity Chronology

Select an item from the list:
- Catherine, Duchess
- Wedding of Prince Peter B. and Anna M.
- Wedding dress of Anna M.
- Anna M. Elementary School
- Anna M. Engagement Ring
- Anna M.
- Anna M.
- Anna M. effect
- view more — 620

Any time
Past 3 months
Past 6 months
Past year

Top 10 events
Top 20 events
Top 50 events
Top 100 events

Volume 0 July 22, 2013 — 602
2013

— 622 ...very ill

Anna M.
Anna M. is the wife of prince Peter B., and a member of a Royal Family. — 614

— 616

— 612

» Duchess Anna's morning sickness lands her in hospital

» January 4, 2012
Anna M. picks charities she'll support, key step in the Royal hierarchy » April 26, 2011
Let Anna have her own wedding » March 27, 2011
Royal wedding: Anna M. has 'quiet night in with friends' for hen party

— 650

RELEVANCE DETERMINATION AND SUMMARY GENERATION FOR NEWS OBJECTS

BACKGROUND

The present disclosure relates to generating summaries of objects referenced in the news based on relevance.

People often search the Internet for information about a particular person, place, topic, etc. However, existing search engines often return results that are irrelevant or off-topic. Relevancy can be difficult for computers to determine because it may require the computers to understand the context of the information. For example, existing search engines may provide a news story mentioning a particular sickness in response to a search about the sickness, even though the premise of the news story is directed to an unrelated event.

SUMMARY

According to one innovative aspect of the subject matter being described in this disclosure, a system aggregates news documents from one or more news sources. The system groups the news documents into a plurality of news collections, each of the news collections including a sub-set of the news documents having related content. The system determines objects described by the news collections, the objects collectively forming a set of objects. The system measures a relevance of each of the news collections with respect to the objects respectively described by the news collections and determines one or more news collections from the plurality of news collections to be associated with a first object included in the set of objects based on the relevance of the one or more news collections to the first object.

In general, another innovative aspect of the subject matter described in this disclosure may be embodied in methods that include aggregating news documents from one or more news sources; grouping the news documents into a plurality of news collections, each of the news collections including a sub-set of the news documents having related content; determining objects described by the news collections, the objects collectively forming a set of objects; measuring a relevance of each of the news collections with respect to the objects respectively described by the news collections; and determining one or more news collections from the plurality of news collections to be associated with a first object included in the set of objects based on the relevance of the one or more news collections to the first object.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include receiving a query for a chronological summary of news documents about the first object; determining a set of news documents from the one or more news collections that are associated with the first object; generating the chronological summary based on the set of news documents; providing the chronological news summary for presentation to the user; processing the news collections for events that the objects respectively described by the news collections are involved in; that measuring the relevance of each of the news collections with respect to the objects respectively described by the news collections includes determining whether the events associated with the objects are pertinent based on an object-type of the objects; determining object-types for the objects; determining a list of pertinent events for each of the object-types; that determining whether the events associated with the objects are relevant based on an object-type of the objects includes determining, for each of the events in the news collections, an object involved in that event, an object-type for the object, and whether that event is included the list of pertinent events for the object-type; that measuring the relevance of the news collections with respect to the objects respectively described by the news collections includes one or more of measuring an overall relevance of each of the news collections, measuring a level of interest in the objects respectively described by the news collections, and measuring a significance of the objects in the news collections; that measuring the overall relevance of each of the news collections includes one or more of determining the number of news sources in each of the news collections that report on a related topic and determining a level of user interest in each of the news collections; that measuring the level of interest in each of the objects respectively described by the news collections includes one or more of determining, for each of the objects, the number of other news collections mentioning that object during a predetermined timeframe, determining a trend for each of the objects on one or more social networks during the predetermined timeframe, and determining, for each of the objects, a number of search queries searching for information about that object during the predetermined timeframe; and that measuring the significance of the objects in the news collections includes one or more of determining the number of times each of the objects appears in titles of the news documents of the news collections, determining a centrality of each of the objects in the news documents of the news collections, and determining a pertinence of events described by the news collections that involve the objects. For instance, the features may include that the first object includes one or more of an entity, an event, and a topic.

These implementations are particularly advantageous in a number of respects. For instance, the technology described herein can determine news documents about a given object that are highly relevant to the user and facilitate the surfacing of those documents in news results and/or search suggestions when the user queries for news pertaining to the given object. This can eliminate or move the less relevant or irrelevant news documents referencing the object to later time or pages, and thus provide more accurate news results and/or search suggestions that truly involve the user's object of interest. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIGS. 6A and B are graphic representations of example user interfaces including example news summaries.

DETAILED DESCRIPTION

Figure 1:
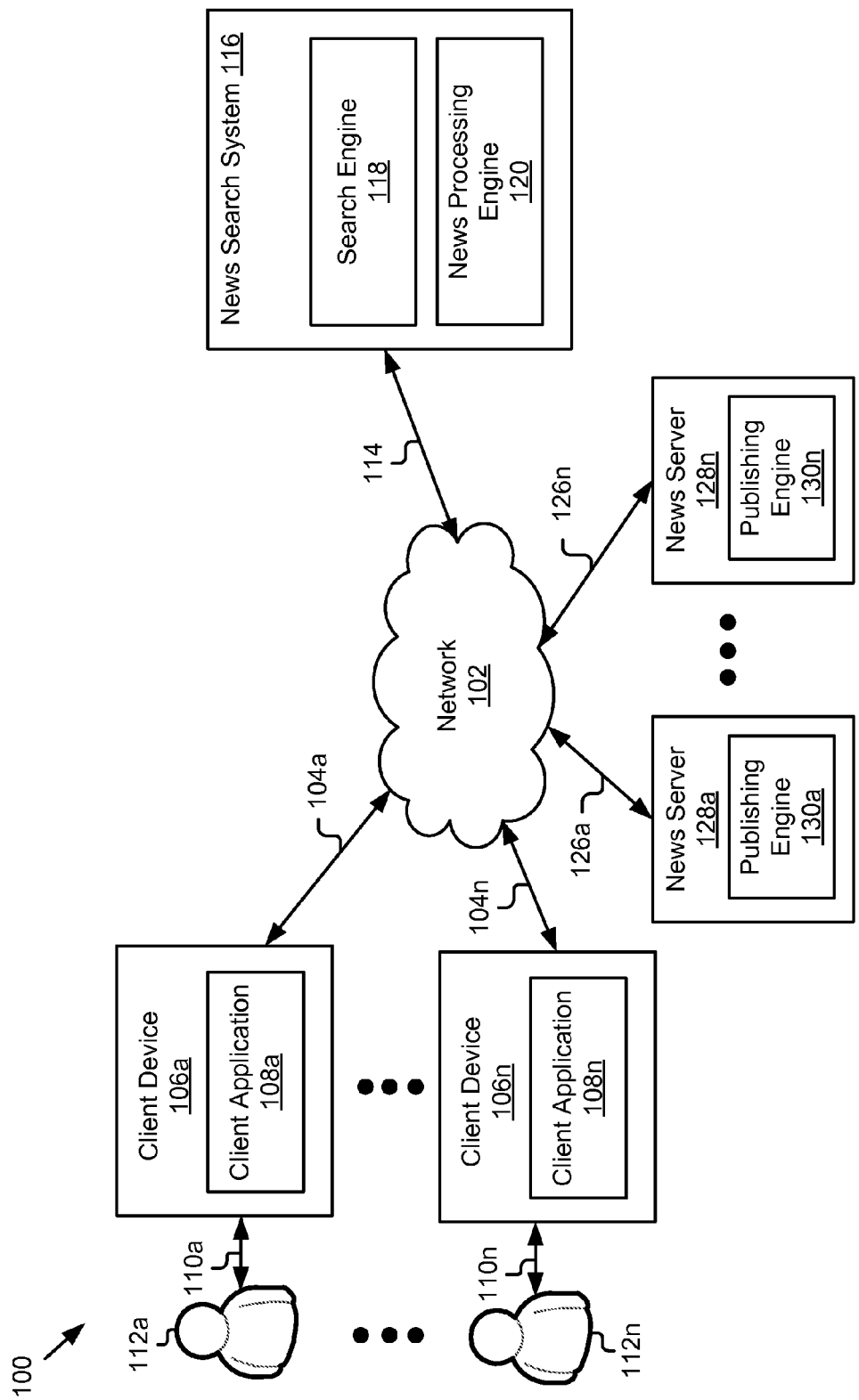
FIG. 1 is a block diagram illustrating an example system for generating summaries of objects referenced in the news based on relevance.

FIG. 1 is a block diagram of an example system 100 for generating summaries of objects referenced in the news based on relevance. The illustrated system 100 includes client devices 106a . . . 106n, news servers 128a . . . 128n, and a news search system 116, which are communicatively coupled via a network 102 for interaction with one another. The client devices 106a . . . 106n may be respectively coupled to the network 102 via signal lines 104a . . . 104n and may be accessible by users 112a . . . 112n (also referred to individually and collectively as 112) as illustrated by lines 110a . . . 110n. The news servers 128a . . . 128n may be respectively coupled to the network 102 via signal lines 126a . . . 126n and the news search system 116 may be coupled to the network 102 via signal line 114. The use of the nomenclature "a" and "n" in the reference numbers indicates that the system 100 may include any number of those elements having that nomenclature.

It should be understood that the system 100 illustrated in FIG. 1 is representative of an example system for news chronology generation for entities, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system may be integrated into to a single computing device or system or additional computing devices or systems, etc.

The network 102 may include any number and/or type of networks, and may be representative of a single network or numerous different networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The client devices 106a . . . 106n (also referred to individually and collectively as 106) are computing devices having data processing and communication capabilities. In some implementations, a client device 106 may include a processor (e.g., virtual, physical, etc.), a memory, a power source, a communication unit, and/or other software and/or hardware components, including, for example, a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices.

In the depicted implementation, the client devices 106a . . . 106n respectively contain instances 108a . . . 108n of a client application (also referred to individually and collectively as 108). The client application 108 may be storable in a memory (not shown) and executable by a processor (not shown) of a client device 106. The client application 108 may include a browser application (e.g., web browser, dedicated app, etc.) that can retrieve, store, and/or process information hosted by one or more entities of the system 100 (for example, the news server 128 and/or the news search system 116) and present the information on a display device (not shown) on the client device 106.

The news servers 128a . . . 128n (also referred to individually and collectively as 128) may each include one or more computing devices having data processing, storing, and communication capabilities. For example, a news server 128 may include one or more hardware servers, server arrays, storage devices and/or systems, etc. In some implementations, the news servers 128a . . . 128n may include one or more virtual servers, which operate in a host server environment and access the physical hardware of the host server including, for example, a processor, memory, storage, network interfaces, etc., via an abstraction layer (e.g., a virtual machine manager).

In the depicted implementation, the news servers 128a . . . 128n include publishing engines 130a . . . 130n (also referred to individually and collectively as 130) operable to provide, publish, and/or syndicate news on a variety of different topics via the network 102. News may include new information as provided by established news sources, blogs, microblogs, social media streams, website postings and/or updates, etc. In some instances, the publishing engines 130 provide documents about events that are occurring (e.g., real-time) including, for example, regional news, national news, sports, politics, world news, entertainment, research, technology, local events and news, etc., and users 112 may access the news portals to consume the content. The documents may include any type of digital content including, for example, text, photographs, video, etc. The news servers 128 may be accessible and identifiable on the network 102, and the other entities of the system 100 may request and receive information from the news servers 128.

The news search system 116 is a computing system operable to provide users with the ability to search for relevant news documents and receive news summaries containing relevant news documents about the news objects the users are interested in. In the depicted implementation, the news search system 116 includes a search engine 118 and a news processing engine 120.

The search engine 118 includes software and/or logic executable to aggregate news documents from a variety of news sources (e.g., publishing engines 130), process the news documents for searchability and retrievability, and/or store the news documents in a data store for later access and/or retrieval. In some implementations, the search engine 118 may crawl the various entities interconnected via network 102 for documents stored on those entities, including, for example, web content (e.g., HTML, portable documents, audio and video content, images), structured data (e.g., XML, JSON), objects (e.g., executables), etc. The search engine 118 may aggregate the documents (and/or incremental updates thereto), process the aggregated data for optimal searchability, and provide the aggregated/processed data to the other components of the system 100 and/or store in a data store (e.g., data store 210 in FIG. 2A) as aggregated data 212 for access and/or retrieval by the other components of the system 100, including, for example, the news processing engine 120 and its constituent elements. The search engine 118 may be coupled to the news processing engine 120 and/or the data store 210 to send and/or receive data.

The news processing engine 120 includes software and/or logic executable to process the data aggregated by the search engine 118, group the articles into news collections, determine objects described/referenced by the news collections, measure relevance of news collections with respect to the objects referenced by them, receive and process object queries, and generate news summaries and suggestions for search terms for the objects based on the measured relevance. Additional acts, structure, and/or functionality of the news search system 116 is described in further detail below with respect to at least FIGS. 2A-B.

Figure 2A:
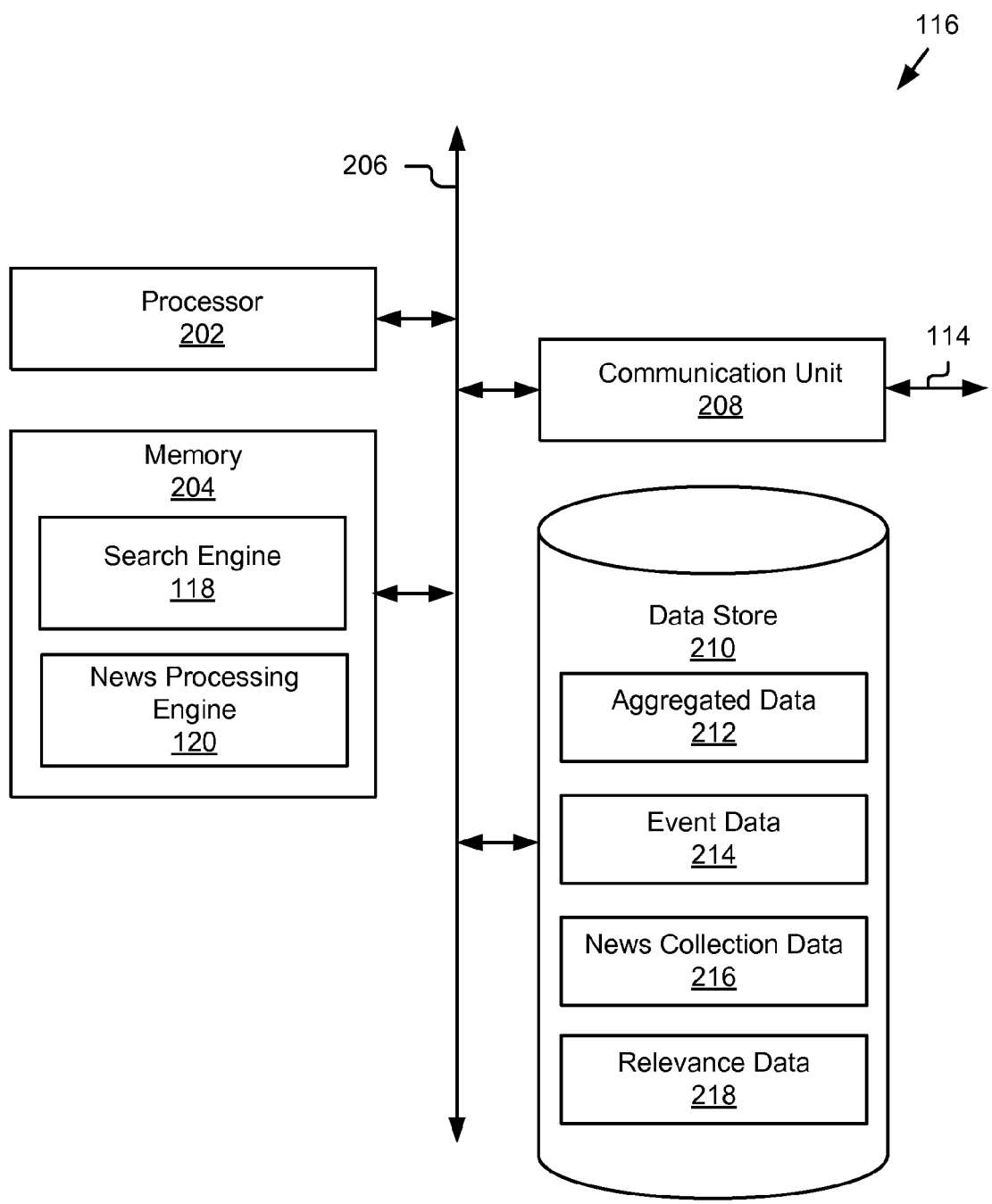
FIG. 2A is a block diagram illustrating an example news search system.

FIG. 2A is a block diagram of an example news search system 116. As depicted, the news search system 116 may include a processor 202, a memory 204, a communication unit 208, and a data store 210, which may be communicatively coupled by a communication bus 206. The news search system 116 depicted in FIG. 2A is provided by way of example and it should be understood that it may take other forms and include additional or fewer components without departing from the scope of the present disclosure.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the news search system 116 including, for example, the memory 204, communication unit 208, and the data store 210.

The memory 204 may store and provide access to data to the other components of the news search system 116. In some implementations, the memory 204 may store instructions and/or data that may be executed by the processor 202. For example, as depicted, the memory 204 may store the search engine 118 and the news processing engine 120. The memory 204 is also capable of storing other instructions and data, including, for example, an operating system, hardware drivers, other software applications, databases, etc. The memory 204 may be coupled to the bus 206 for communication with the processor 202 and the other components of the news search system 116.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray®, etc.). It should be understood that the memory 204 may be a single device or may include multiple types of devices and configurations.

The bus 206 can include a communication bus for transferring data between components of a computing device or between computing devices, a network bus system including the network 102 or portions thereof, a processor mesh, a combination thereof, etc. In some implementations, the search engine 118 and the news processing engine 120 operating on the news search system 116 may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices for wired and wireless connectivity with the network 102 and the other entities and/or components of the system 100 including, for example, the client devices 106, the news servers 128, etc. For instance, the communication unit 208 may include, but is not limited to, CAT-type interfaces; wireless transceivers for sending and receiving signals using Wi-Fi™; Bluetooth®, cellular communications, etc.; USB interfaces; various combinations thereof; etc. The communication unit 208 may be coupled to the network 102 via the signal line 114 and may be coupled to the other components of the news search system 116 via the bus 206. In some implementations, the communication unit 208 can link the processor 202 to the network 102, which may in turn be coupled to other processing systems. The communication unit 208 can provide other connections to the network 102 and to other entities of the system 100 using various standard communication protocols, including, for example, those discussed elsewhere herein.

The data store 210 is an information source for storing and providing access to data. In some implementations, the data store 210 may be coupled to the components 202, 204, 208, 118, and/or 120 of the news search system 116 via the bus 206 to receive and provide access to data. In some implementations, the data store 210 may store data received from the other entities 106 and 128 of the system 100, and provide data access to these entities. Examples of the types of data stored by the data store 210 may include, but are not limited to, aggregated data 212 (e.g., sets of documents aggregated and processed by the search engine 118), event data 214 (e.g., predetermined lists of events for various objects as determined by the processing engine 120), news collection data 216 (e.g., sets/groups of related documents, descriptions of the news collections and/or documents, etc., as determined by the news processing engine 120), relevance data 218 (e.g., relevance of news collections and/or documents thereof with respect to objects described by them, relevance scores associated with the news collections, significance of objects in the news collections, level of user interest in a particular news collection and/or object, etc., as determined by the processing engine 120), etc.

The data store 210 can include one or more non-transitory computer-readable mediums for storing the data. In some implementations, the data store 210 may be incorporated with the memory 204 or may be distinct therefrom. In some implementations, the data store 210 may include a database management system (DBMS) operable by the news search system 116. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

Figure 2B:
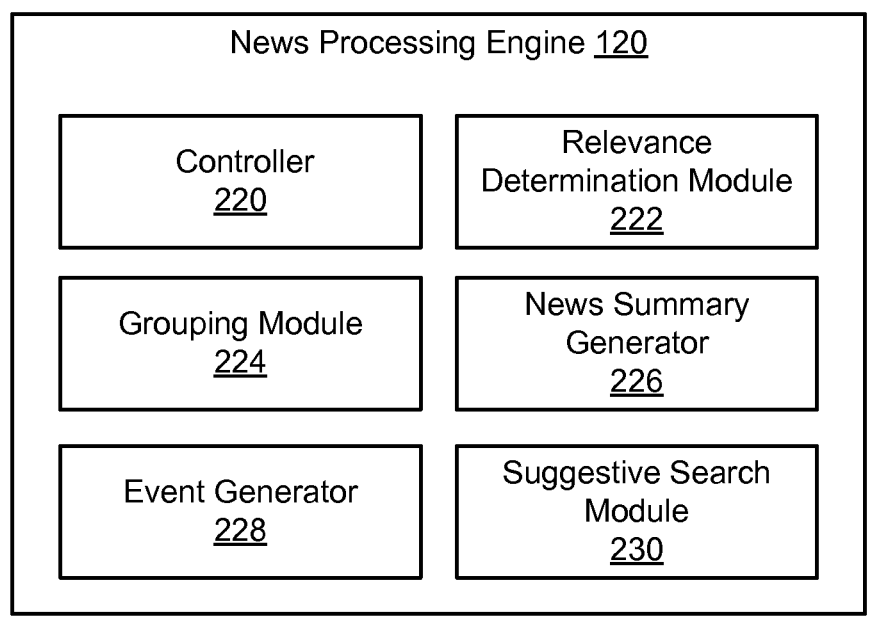
FIG. 2B is a block diagram illustrating an example news processing engine.

FIG. 2B is a block diagram of an example news processing engine 120. As depicted, the news processing engine 120 may include a controller 220, a relevance determination module 222, a grouping module 224, a news summary generator 226, an event generator 228, and a suggestive search module 230. The components 118, 120, 220, 222, 224, 226, 228, and/or 230 may be communicatively coupled by the bus 206 and/or the processor 202 to one another and/or the other components 204, 208, and 210 of the news search system 116. In some implementations, one or more of the components 118, 120, 220, 222, 224, 226, 228, and/or 230 are sets of instructions executable by the processor 202 to provide their functionality. In other implementations, one or more of the components 118, 120, 220, 222, 224, 226, 228, and/or 230 are stored in the memory 204 of the news search system 116 and are accessible and executable by the processor 202 to provide their functionality. In any of the foregoing implementations, these components 118, 120, 220, 222, 224, 226, 228, and/or 230 may be adapted for cooperation and communication with the processor 202 and other components of the news search system 116.

The controller 220 includes software and/or logic executable to receive data from one or more other entities of the system 100, including for example, the client devices 106, signal one or more of the other components of the news processing engine 120 and/or the search engine 118 to begin processing, and manage session variables among other things. In some implementations, the controller 220 may receive a search query, process it for search parameters, store the search parameters in memory as variables for use by one or more of the other components including, for example, the news summary generator 226 and/or the suggestive search module 230, and/or signal these components to begin processing. The controller 220 may be communicatively coupled to the other entities 222, 224, 226, 228, and/or 230 to send and receive data and/or processing signals. The controller 220 may be coupled to the data store 210 to manipulate various data stored therein.

The relevance determination module 222 includes software and/or logic executable to measure the relevancy of objects. The objects may include people, places, events, topics, keywords, etc., queried for by the user. Measuring the relevancy of a given object relative to a news collection and/or news collection document may include determining which news collections and/or documents thereof include content that describes events that are pertinent to that object-type, is popular, is reputable, is up-to-date and/or new, etc., matches a user's preferences, etc. In some implementations, only a portion of the documents of a given news collection may actually be relevant to a given object, and the relevance determination module 222 store information (e.g., a low relevance score) identifying the non-relevant documents for use by the news summary generator 226 when determining what information to include in a news summary for the object.

In some implementations, the relevance of a given news collection or its documents may be based on the amount of relevance evidence that can be determined. The evidence may include the overall relevance of the news collection, the perceived user interest in the object(s) described by the news collection, and/or the significance of the objects in the news collections, etc., as discussed in further detail below with reference to at least FIGS. 3-5D.

The relevance determination module 222 may measure the relevance of news collections using a measuring system. The measuring system may quantify the relevance of each of the news collections relative to the objects they describe. Relevance may be quantified using an arbitrary scale. The scale may be numerical, categorical, or otherwise. For instance, relevance of a given news collection may be scored on a scale ranging from 1-10, where 10 represents total relevance and 1 represents total irrelevance. In another example, relevance may be scored using a set of relevance categories ranging from totally irrelevant to totally relevant (e.g., totally irrelevant, highly irrelevant, somewhat irrelevant, neutral, somewhat relevant, highly relevant, totally relevant). In some implementations, a relevance score quantifying the relevance between an object and a news collection or news collection document may be an aggregate score that is based on the values of two or more factors and/or aspects thereof, as discussed further elsewhere herein.

In some implementations, the relevance determination module 222 may pre-process the relevance of the news collections to optimize the determination at runtime of which news collections are relevant to the object(s) being queried by the user. Since the content of the news collections may ever evolve based on the data continually being aggregated by the search engine 118 and grouped into existing and/or new news collections by the grouping module 224, the relevance determination module 222 can routinely (re)process the news collections (e.g., at regular intervals) to determine their ongoing relevance to the one or more objects they are associated with. In some instances, the processing by the relevance determination module 222 may coincide with the grouping performed by the grouping module 224 and/or the aggregating performed by the search engine 118. For example, the search engine 118 may signal the grouping module 224 to process various aggregated data upon completing its aggregation, and the grouping module 224 may signal the relevance determination module 222 to process the relevance of the news collections relative to the objects they describe upon grouping the news collections.

The relevance determination module 222 may be coupled to the data store 210 and/or the grouping module 224 to receive the news collection data 216, and may store and/or provide the relevance measurements determined by it to the other components of the news search system 116, including, for example, the data store 210, the news summary generator 226, and/or the suggestive search module 230.

The grouping module 224 includes software and/or logic executable to process the documents aggregated by the search engine 118 that are related into corresponding news collections. A news collection may include a sub-set of the documents described by the aggregated data that have related content. A given document may be included in more than one news collection. For instance, for current events, a news collection may include news articles aggregated from one or more reputable news sources (e.g., web sites) about a recent current event (e.g., political flare up, crime, scandal, sports competition, etc.). In some implementations, a news collection may group together news articles that relate to a given event for a particular timeframe. For instance, for current events, documents related to a recent plane crash, celebrity scandal, supreme court ruling, presidential election, etc., may be grouped into respective news collections. The grouping module 224 may maintain an ongoing news collection related to a particular object (e.g., entity) and/or a series of news collections for that object depending. For instance, the grouping module 224 may maintain a global news collection for a given celebrity as well as news collections based on the timing of different significant events involving the celebrity (e.g., different news collections for around when a new artist appears on the scene, the new artist becomes popular (i.e., a celebrity), the artist goes to rehab for a drug treatment, the artist gets clean, the artist gets married, divorced, goes on tour, etc.).

The grouping module 224 may be coupled to and/or store information about the groupings as news collection data 216 in the data store 210 for access and/or manipulation thereby or by the other components 222, 226, 228, and/or 230 of the news processing engine 120. The grouping module 224 may also be coupled to and provide the news collection data 216 directly to the other components 222, 226, 228, and/or 230 of the news processing engine 120.

In some instances, even though some news collections describe an object that users are interested in, they can in some cases describe events that are unimportant or irrelevant to users. In addition, some news collections may include documents that are loosely associated and some of those documents may report on events that are unrelated or unimportant to users. The relevance determination module 222 is beneficial as it can identify the news collections about a given object or objects that users would be interested in and facilitate the surfacing of those collections in the news summaries and/or search suggestions provided by the news processing engine 120, and conversely, identify the news collections about a given object or objects that users are not interested in receiving updates on and facilitate their removal from the summaries and/or search suggestions provided by the news processing engine 120.

The news summary generator 226 includes software and/or logic executable to determine one or more news collections and/or corresponding documents associated with one or more objects, and generate and provide news summaries including the news collection(s) and/or document(s). In some implementations, a news summary may be generated in response to a search query and may be generated based on the parameters of the query. Example parameters may include data describing one or more objects, a time frame, a number of documents and/or collections to be included, a sorting criterion, etc. For instance, a search query may include the name of an object (e.g., a person, thing, event, topic, etc.). In some instances, the query parameters may include text, images, audio, video, and/or any other data structure that can be processed and matched to stored data.

The news summary generator 226 may determine the information to include for a given object based on the relevance of the news collections and/or their constituent documents, as determined by the relevance determination module 222. In some implementations, the news summary generator 226 may query the data store 210 for a predetermined number of most-relevant news collections to include in a given news summary. In some implementations, the news summary generator 226 may select certain documents from the news collections to include in the news summary in addition to or instead of including the news collections themselves. The selection of these documents may be based on the relevance measurement determined by the relevance determination module 222. For example, the news summary generator 226 may query the data store 210 for a set number of most relevant documents (as reflected by their relevance scores) from one or more news collections also determined to be the most relevant to the object(s) being queried (as reflected by their relevance scores).

In some cases, the news summary generator 226 may include a general description of each of the news collections and/or documents included in the news summary. A general description for a news collection may be generated by the grouping module 224 based on the sub-set of documents that make up the news collection. In some cases, the grouping module 224 may prompt a human user for input for the brief description, may autonomously generate the description using text from one or more of the documents, etc. A general description for a document may be based on that document's own title, or may be independently generated by the news summary generator 226 based on the contents of the document.

The news summary generator 226 may generate an activity graph that illustrates the level of activity a given object has received in the news over time. The activity depicted in the graph may be based on activities and/or events that meet a predetermined relevance threshold. The relevance threshold may be user configured or predetermined by the news processing engine 120 and/or an administrator thereof. The activity graph may serve as a navigation tool that is usable by the user to identify and jump to different time periods based on the level of activity for that time period. An example of the activity graph is depicted in FIGS. 6A and 6B, and described in further detail below. The relevance-based activity graph is advantageous as it can eliminate less relevant and irrelevant news activity referencing the object (e.g., in passing), and thus provide a more accurate depiction of the levels of news activity that truly involve the object.

The news summary generator 226 may sort the items to be included in the news summary based on time, relevance, event-type, a user-defined criterion, etc. For example, the news summary may be a chronological news summary of the most relevant events associated with the object or objects being queried. In the case of multiple objects, the news summary generator 226 may generate a comparison between the objects showing differences in news activity for the objects (e.g., in the activity graph using uniquely identifiable trend lines) and including news summaries for each object. The threshold for how many news collections and/or documents to include in a news summary (at least initially) may be user-configured (e.g., a parameter of the query) or automatically determined by the news summary generator 226 (e.g., a default number). Examples of various news summaries that can be generated by the news summary generator 226 are depicted in FIGS. 6A-6B, and are described in further detail below.

The news summary generator 226 may, in some implementations, use a predetermined list of events for a queried object to organize the contents of the news summary for that object by. For instance, for a medical condition, the news summary generator 226 may summarize the top news collections and/or documents therefrom that pertain to treatment, new drugs, side effects, foundations and institutions researching treatments, statistics about the condition, etc.

The news summaries provided by the news summary generator 226 may be processed by the news summary generator 226 to include presentational information and the client application 108 may use the presentational information to form the look and feel of a user interface and then present the information to a user 112 via the user interface. For example, the news summaries may be formatted using a markup language (e.g., HTML, XML, etc.), style sheets (e.g., CSS, XSL, etc.), graphics, and/or scripts (e.g., JavaScript, ActionScript, etc.), and the client application 108 may interpret the interface instructions and render an interactive Web User Interface (WUI) for display on a user device 106 based thereon. Various example interfaces are described below with reference to at least FIGS. 6A-6B. In some implementations, the client application 108 may determine the formatting and look and feel of the user interfaces independently. For instance, the client application 108 may receive a structured dataset (e.g., JSON, XML, etc.) including the news summary and may determine formatting and/or look and feel of the user interfaces client-side. Using the user interfaces presented by the client application 108, the user can input commands selecting various user actions. For example, using these interfaces users can transmit a search request, implicitly request suggestions for a search, view and interact with search suggestions, view and interact with the news summaries and its constituent elements, etc.

The news summary generator 226 may be coupled to the network 102 to send the news summaries to the computing devices requesting them, including, for example, the client devices 106. The news summary generator 226 may also be coupled to the data store 210 to access the data stored therein, including for example, the news collection data 216, the relevance data 218, and/or the event data 214. The news summary generator 226 may also be coupled to the other components of the news processing engine 120 to send and/or receive data.

The event generator 228 includes software and/or logic executable to generate and/or maintain predetermined lists of events for various object-types. The event generator 228 may determine the list of events prior to runtime to optimize run-time performance. In some implementations, to determine a list for a given object-type, an administrator user may input and/or confirm the events to be included in the list (e.g., via an user interface associated with the event generator 228) and the event generator 228 may receive and process the input, and/or store it in the data store 210 as event data 214. In some implementations, the event generator 228 may retrieve and process the information for a given object-type from knowledge base (e.g., encyclopedic information source) for pertinent events associated with the object-type and use those events to create the list. Additional acts, structure, and functionality of the event generator 228 are described below with reference to at least FIGS. 5A-5D.

The news summary generator 226 may be coupled to the network 102 to retrieve information about object-types, and coupled to the data store 210 to retrieve, store, or otherwise manipulate event data 214. The event generator 228 may also be coupled to the other components 220, 222, 224, 226, and/or 230 to send and receive data, including for example, object-related data, event data 214, etc.

The suggestive search module 230 includes software and/or logic executable to generate search suggestions for a given object. In some implementations, the suggestive search module 230 may provide the search suggestions in response to a suggestion request being received from a client device 106. For example, the controller 220 may receive the request, determine the search parameters from the request, and signal the suggestive search module 230 to generate and provide the search suggestions. In another example, the suggestive search module 230 may receive and process the request independently. In some implementations, the request may be an asynchronous request transmitted by the client application 108 (e.g., a web browser) to the news processing engine 120, and in response, the suggestive search module 230 may generate a structure dataset (e.g., JSON, XML, etc.) including the suggestions and transmit the dataset back to the client device 106 for presentation in (near) real-time.

The suggestive search module 230 may determine the suggestions based on the relevance data 218 processed by the relevance determination module 222. In some implementations, based on the continual aggregation by the search engine 118, grouping by the grouping module 224, and the relevance measuring by the relevance determination module 222, the relevance data 218 includes the most current, salient events for a given object and the suggestive search module 230 may generate suggestions based on those events and provide them in response to the request. For example, the suggestive search module 230 may use the relevance scores of the news collections to determine which collections are the most relevant and may access descriptors (e.g., keywords, phrases, etc.) stored in association with the collections (e.g., by the grouping module 224) and use them for determining the suggestions.

The suggestive search module 230 may be coupled to the network 102 to provide the search suggestions to other entities of the system 100 including, for example, the client devices 106. The suggestive search module 230 may also be coupled to the data store 210 to retrieve, store, or otherwise manipulate data including, for example, object-related data, event data 214, news collection data 216, and/or relevance data 218. The suggestive search module 230 may also be coupled to the other components 220, 222, 224, 226, and/or 228 to send and receive data, including for example, object-related data, event data 214, news collection data 216, and/or relevance data 218.

Because users often search for information about significant events that are occurring or that have just occurred, and the news search system 116 is capable of surfacing the most current, useful, pertinent, popular, reliable, etc., information about those events, whether it be in the form of search suggestions, news summaries, or other content provided to the user by the news search system 116 (e.g., via electronic message alerts, social network updates, etc.). Additional structure, acts, functionality, and/or benefits of the search engine 118 and the news processing engine 120 are further discussed below with reference to at least FIGS. 3-6B.

Figure 3:
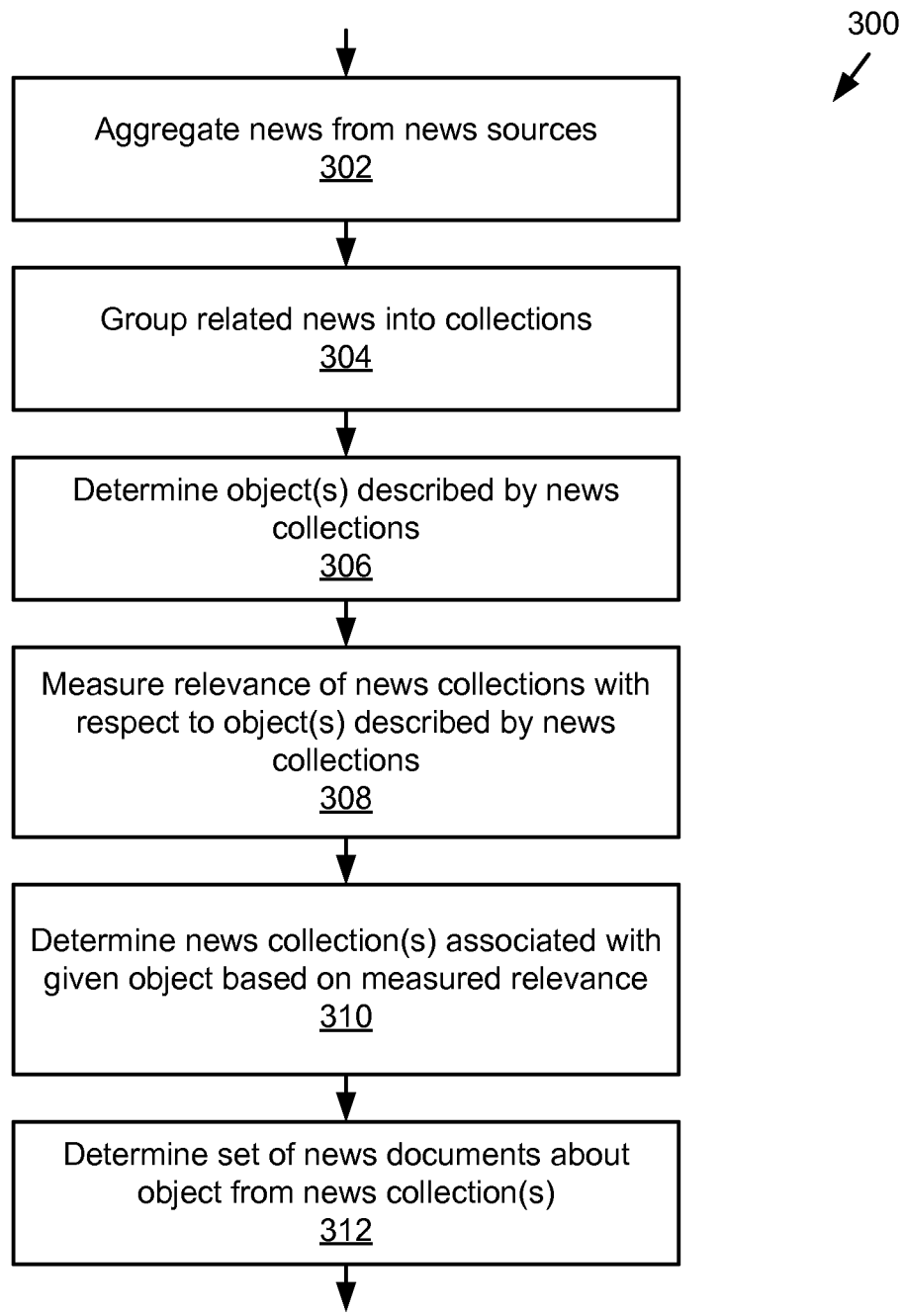
FIG. 3 is a flowchart of an example method for measuring relevancy of objects and determining a relevant set of documents for a given object using the measured relevancy.

FIG. 3 is a flowchart of an example method for measuring relevancy of objects and determining a relevant set of documents for a given object using the measured relevancy. The method 300 may begin by aggregating 302 news from news sources. In some implementations, the search engine 118 may aggregate the data by crawling the network 102 for content and store a representation of the content/documents (as aggregated data 212) in the data store 210. In some implementations, news sources may submit and/or syndicate new content/documents to the search engine 118 (e.g., via a syndication stream), and the search engine 118 may process and store that information in the data store 210 as aggregated data 212.

Next, the method 300 may group 304 related news into collections. For example, the search engine 118 and/or the grouping module 224 may process the documents aggregated by the search engine 118 that are related into corresponding collections. In some implementations, the documents may be determined as related based on metadata (e.g., titles, release date, keywords, description, etc.) accompanying or included in the documents (e.g., a header) and/or the body of the documents. For example, two or more documents that have "earthquake" and "China" in their titles may be grouped into the same news collections. A given document may be grouped into more than one news collection. For instance, in the previous example the documents having "earthquake" and "China" in their titles may be also grouped into a news collection about Asian natural disasters and/or China. When grouping the news into news collections, the search engine 118 and/or the grouping module 224 may store information about the groupings as news collection data 216 in the data store 210.

In block 306, the method 300 may determine what objects are described/referenced by each of news collections and then measure in block 308 the relevance of the news collections with respect to the object(s) described by the news collections. Relevance between a news collection and an object described by it may, in some implementations, be determined by the relevance determination module 222 based on aspects of the news collection itself, aspects of the constituent documents that make up the news collection, and/or aspects of the object itself. An example method for determining relevance is discussed in further detail below with reference to at least FIGS. 5A-5D.

The method 300 may then determine 310 which news collection(s) are associated with an object (or objects) based on the relevance measured for that object. For example, the news summary generator 226 may query the news collection data 216 based on a given object or objects and the data store 210 may return a set of one or more news collections that are associated with the object(s) based on the relevance of the news collections to the object(s). A set of documents about the object (or objects) may then be determined from the news collections by the method 300. For instance, the news summary generator 226 may determine a set of documents that best summarize the news for the object(s) based on their individual relevance, recency, popularity, uniqueness, reputability, reliability, etc.

Figure 4:
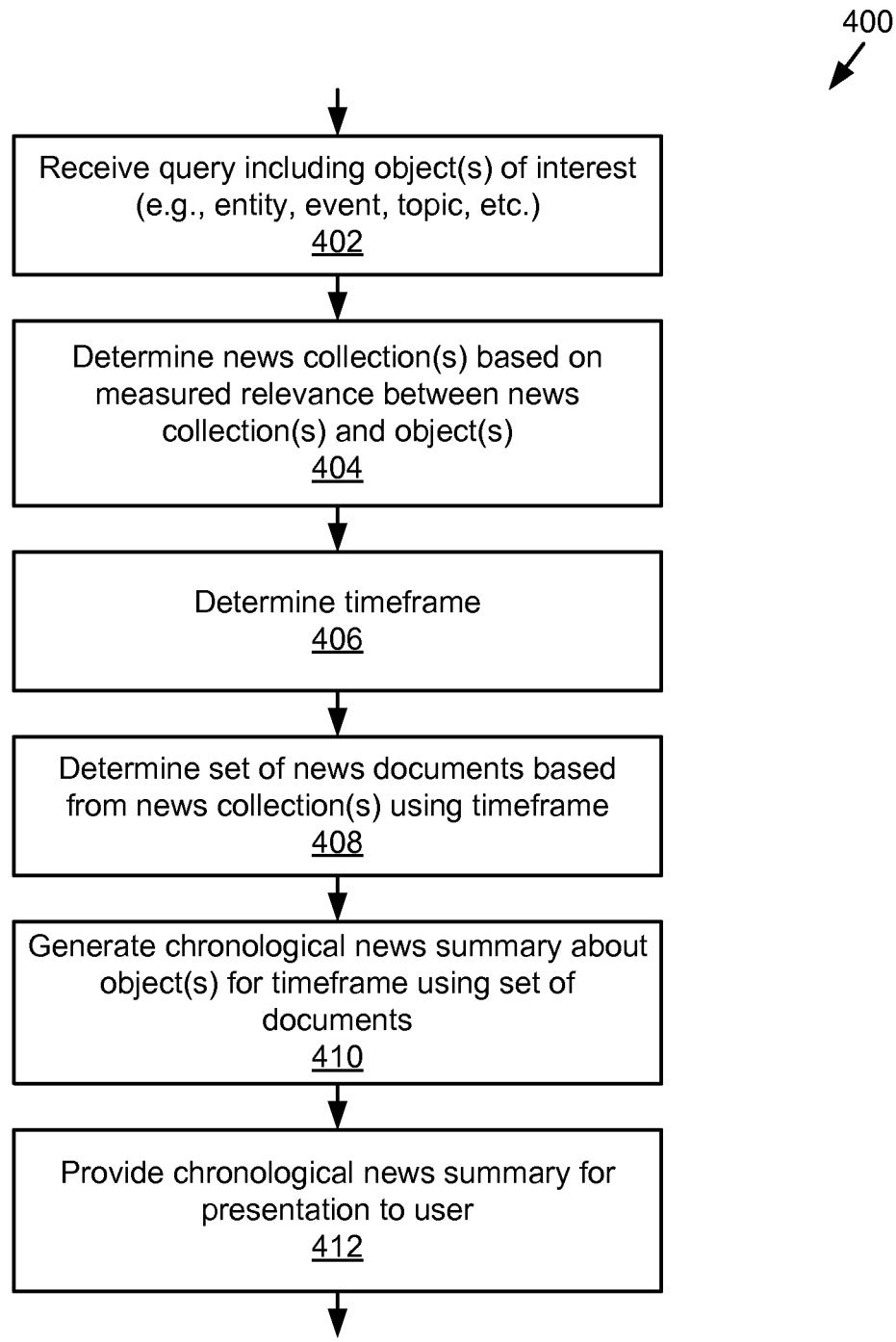
FIG. 4 is a flowchart of an example method for receiving and processing a query for a chronological news summary summarizing one or more objects of interest.
Figure 5A:
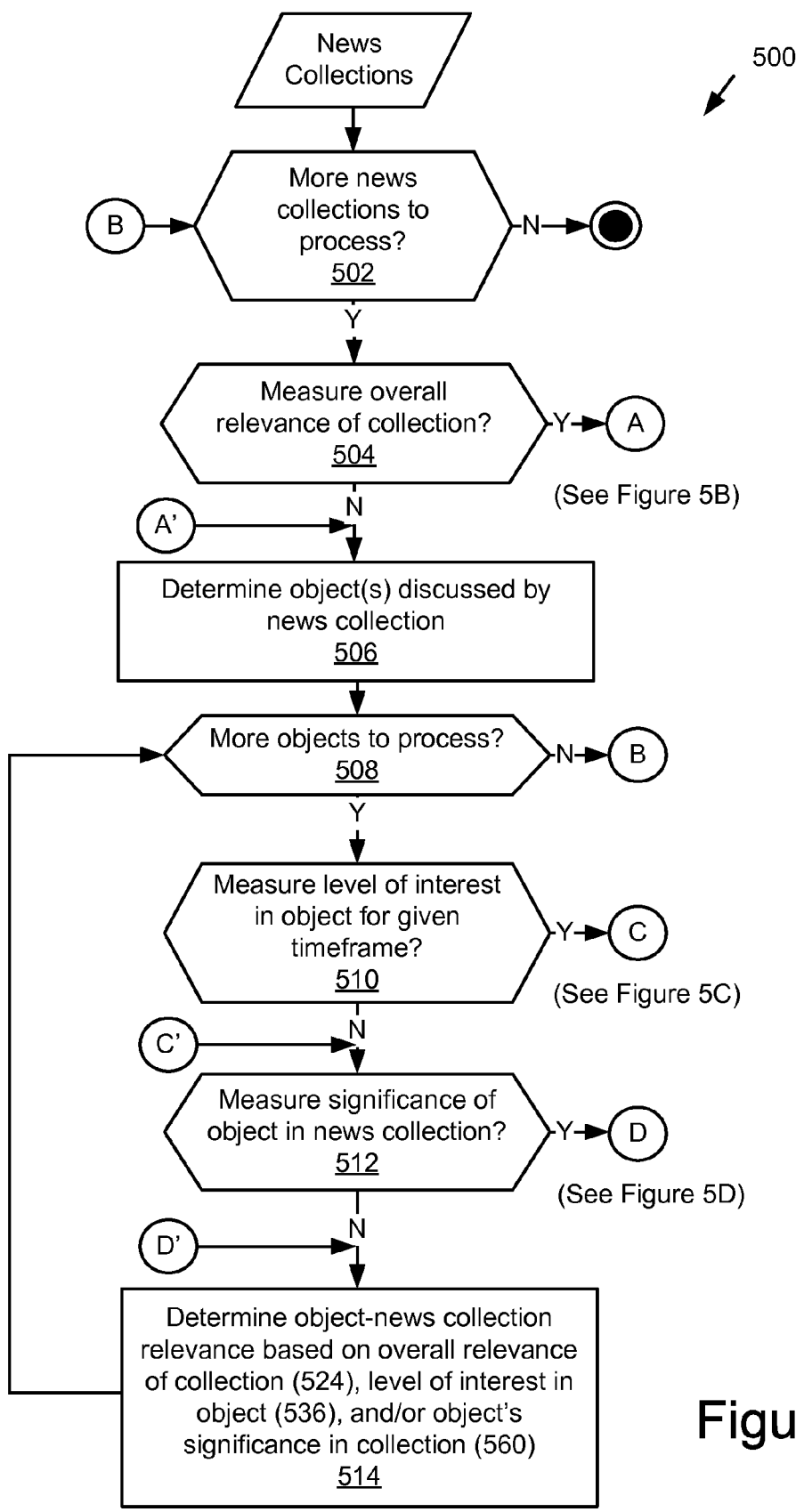
FIGS. 5A-D are flowcharts of an example method for measuring relevance between objects and news collections.
Figures 5B, 5C:
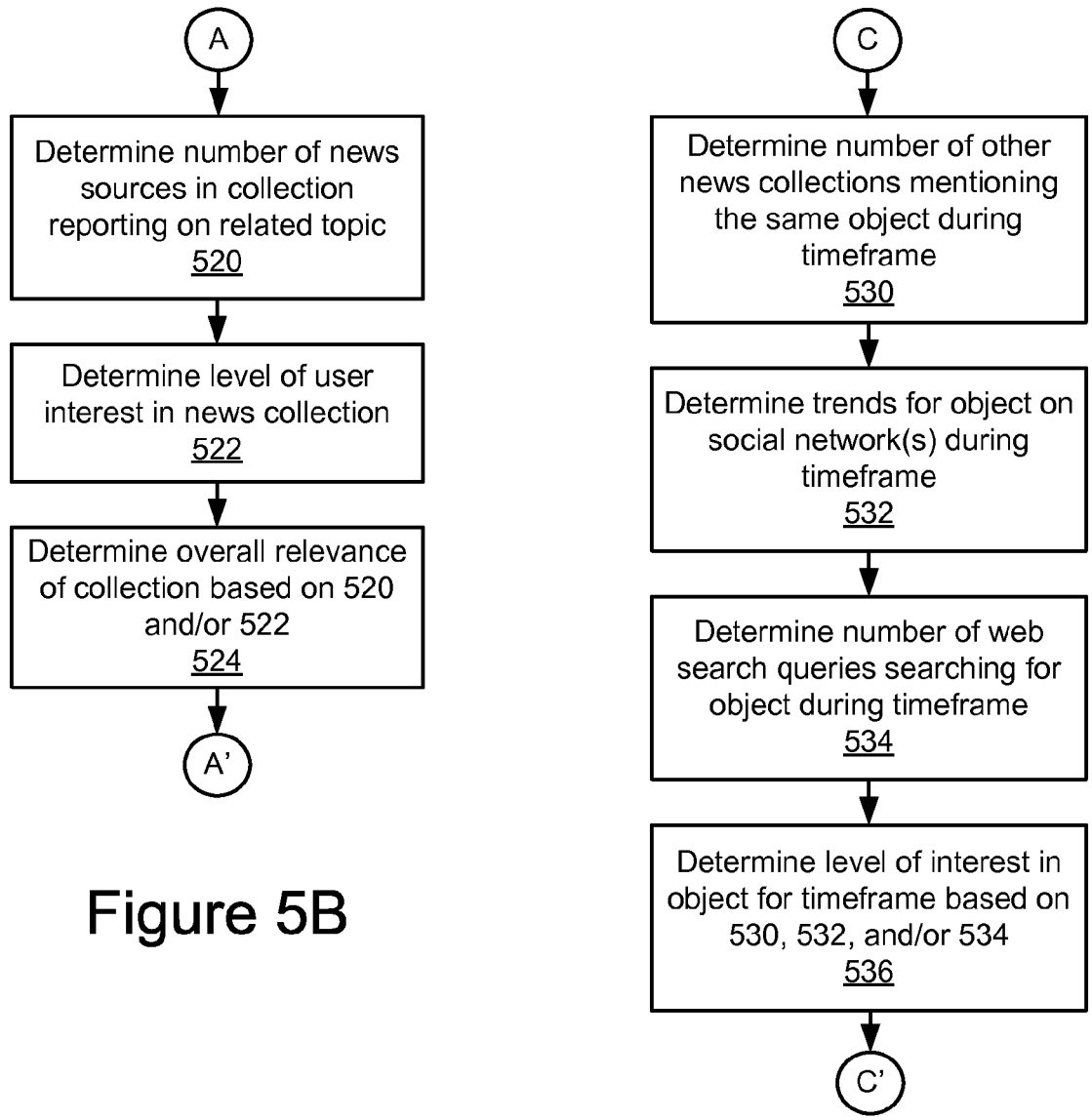
Figure 5D:
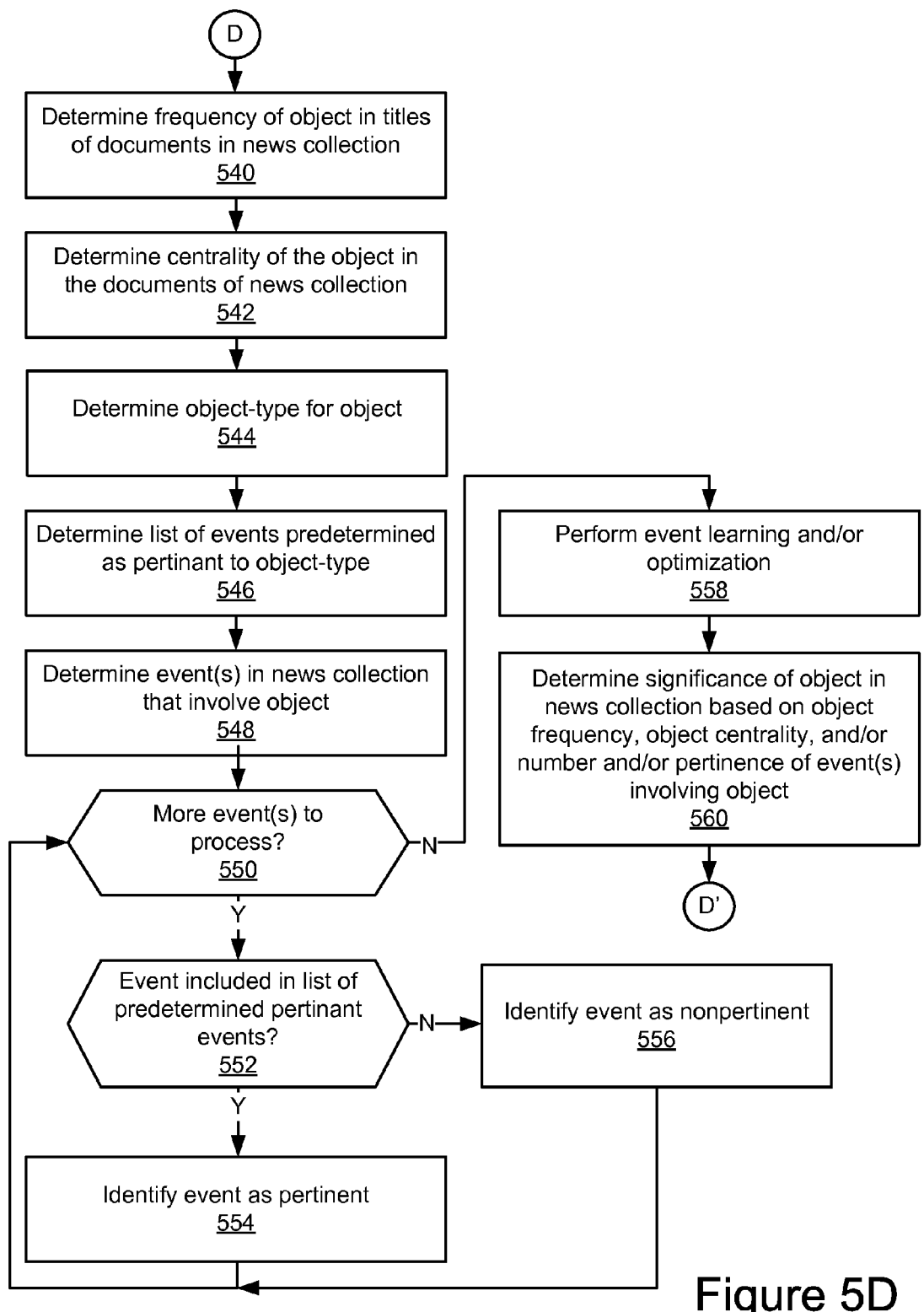

FIG. 4 is a flowchart of an example method for receiving and processing a query for a chronological news summary summarizing one or more objects of interest. In block 402, the method 400 may receive a query including one or more objects of interest. In some implementations, a user may input one or more objects into a search interface (e.g., see FIGS. 6A and 6B and corresponding description) and submit a query for relevant information about the objects. In response, the controller 220 may receive the query and trigger a search for one or more news collections associated with the objects included in the query. In some instances, the query may be a query for a chronological summary of news documents about the one or more objects included in the query.

Next, the method 400 may determine 404 one or more news collections that are associated with the queried object(s) based on the measured relevance between the news collection(s) and the object(s). In some implementations, the relevance between a given news collection and an object is quantified by the relevance determination module 222 and stored in the data store 210 as relevance data 218, as discussed elsewhere herein. This relevance measurement can be used in block 404 by the news summary generator 226 to identify one or more news collections that are associated with each of the queried objects.

In block 406, the method 406 may determine a timeframe. The timeframe may be received with the query as a parameter or may be automatically determined at runtime by the news processing engine 120. In some cases, the timeframe may be predetermined or may be user-configurable. In some implementations, the timeframe may be used by the news summary generator 226 to limit and/or order the information being included in the news summary being generated. For instance, the news summary generator 226 may exclude any documents from the news collections that fall outside of a date range defined by the timeframe. Non-limiting examples of the timeframe may include a predetermined number of days, weeks, months, years, etc. (e.g., past 30 days, past year, etc.), a date range (e.g., 1/1/2005-1/31/2011), time since last query, etc. In some implementations, the timeframe may be omitted and the news summary generator 226 may generate a summary that summarizes the most salient events about the queried object(s) that have transpired over time. In some implementations, the timeframe may be a loose condition and the news summary generator 226 may generate a summary that summarizes news about the queried object(s) during that timeframe, but that also includes other salient information and/or recommended content about the queried object(s). Other implementations are also possible and contemplated.

In block 408, the method 400 may determine a set of news documents from the news collection(s) that are associated with the queried object(s) using the timeframe. In some implementations, the documents may be selected from the news collection(s) based on the types and/or significance of the events that they describe, their date of publication, their source, their individual popularity, relevance, recency, reliability, reputability, etc., a combination of the foregoing, etc. To determine the set of news documents that should be used in generating the news summary, the news summary generator 226 may in some cases use a list of event-types predetermined as the most interesting to readers. For instance, for a query about a particular celebrity, the news summary generator 226 may use the predetermine list of event types of marriage, divorce, scandals, new releases (e.g., movies, music, books,), birth of baby, etc., to select the news documents that should be used to generate the summary.

Next, the method 400 may generate 410 a news summary about the queried object(s) for timeframe using the set of documents. In some implementations, the news summary may be chronological, beginning with the most recent news and ending with the oldest news (for the timeframe). Once generated, the method 400 may provide 412 the news summary for presentation to user. For instance, the controller 220 and/or the news summary generator 226 may transmit the news summary to a client device of the user that submitted the query for presentation. Examples of news summaries are described below with reference to at least FIGS. 6A-6B.

FIGS. 5A-D are flowcharts of an example method 500 for measuring relevance between objects and news collections. In block 502, the method 500 may process each news collections received, and upon processing the news collections, may return to another method, repeat, or terminate. In some implementations, the relevance determination module 222 may receive the news collections to be processed from the data store 210 or the search engine 118. Next, in block 504, the method 500 may determine whether to measure an overall relevance of each of the news collections. If so, the method 500 may determine 520 the number of news sources in each of the news collections that report on a related object (e.g., topic). For instance, if the majority of documents of a news collection predominantly describe a particular object (e.g., topic, event, person, place, or thing), the news collection may determine the news collection to be highly relevant to that object as compared to a news collection that includes documents describing a variety of loosely related objects, etc. (topics, events, people, places, things, etc.).

Additionally or alternatively, the method 500 may determine 522 a level of user interest in each of the news collections. User interest may be based on the number of users who have selected and/or searched for the news collection while reading the news on a news portal. Usage data describing user interest in the news collection may be stored in the data store 210, and the relevance determination module 222 may query the usage data to determine the level of user interest in a particular news collection. In some instances, the search engine 118, a publishing engine 130, or another entity of the system 100 may generate and store the usage data in association with the news collection and/or its constituent documents in the data store 210.

Based on the number of news sources in the news collection that report on a related topic and/or the level of user interest in the news collection, the method 500 may determine 524 the overall relevance of the news collection. In some implementations, the relevance determination module 222 may compute an overall relevance metric for the news collection that quantifies the overall relevance of the news collection respective to the overall relevance of other news collections. This reflects the notion that a news collection is usually more relevant if it is popular (accessed frequently by users compared to other news collections) and a greater percentage of its constituent documents report on a related topic as compared to other news collections. The relevance determination module 222 may store relevance data describing the overall relevance determinations made by it in the data store 210 for later access.

The method 500 then proceeds to block 506 where it may determine the objects discussed/described by the news collection and then process 508 each of the objects for relevance. To do so, in block 510, the method 500 may determine 510 whether to measure the level of interest in the object for a given timeframe, and if so, may determine 530 the number of other news collections mentioning same object during the timeframe. In some implementations, the relevance determination module 222 may query the news collection data 216 stored in the data store 210 to determine how many other collections mention, describe, reference, etc., the object being considered during the timeframe, and may use the number of collections (at least in part) to determine the level of interest in the object for the timeframe. This is based on the assumption that the more news collections that mention the object during the timeframe, the higher the level of interest is in that object during that timeframe.

The method 500 may also determine 532 if the objects are trending on one or more social networks during the timeframe and determine 534 the number of web search queries searching for the object during the timeframe. The social network trends may show the level of user interest on the social networks in the object during the timeframe. The social network trends may be computed by the relevance determination module 222 based on the number of times information (e.g., articles, web pages, videos, images, etc.) describing the object have been posted, shared, endorsed (negatively or positively), commented on, or otherwise interacted with on the social network. Social network data including this information may be stored in and accessible from the data store 210 or accessible from an information source (e.g., social network server, not shown) coupled to the network 102. The number of Web search queries may show how many users proactively searched for and accessed information about the object during the timeframe. Usage data reflecting the number of search queries searching for the object during the timeframe may similarly be stored in and accessible from the data store 210 or another information source coupled to the network 102.

Next, the method 500 may determine 536 the level of interest in the object based on the number of other news collections mentioning that object during the timeframe (e.g., as determined in block 530), trend(s) associated with the object on one or more social networks during the timeframe (e.g., as determined in block 532), and/or the number of search queries searching for information about that object during the timeframe (e.g., as determined block 534). For example, if the object concurrently experienced a high search rate and a spike in activity on one or more social networks comparative to an average search rate and social network trends, the relevance determination module 222 may quantify the level of interest in that object to be comparatively high for the timeframe. Similarly, if five or more distinct news collections mentioned the object frequently during the timeframe and the search rate for the object on one or more search engines was 50% or more higher than the average search rate, the relevance determine module 22 may quantify the level of interest in that object to be comparatively high for the timeframe. It should be understood that, as with all example scenarios and implementation described herein, the forgoing examples are provided for the purposes of elucidating various aspects of the novel technology set forth herein and should not be construed as limiting. The relevance determination module 222 may access the news collection, social network, and search data from the data store 210 or another information source when computing object interest determination(s) in block 536.

Next, in block 512, the method 500 may determine whether to measure 512 the significance of the object in the news collection. If so, the method may determine 540 the frequency of the object in the titles of the documents included in the news collection. In some cases, the presence of the object in the title of a document (e.g., news article) indicates that the object plays an important, salient role in the topic being conveyed by the document. The method 500 may also determine 542 the centrality of the object in the documents of the news collections. In some implementations, the centrality of the object in a particular document may be based on whether the object is mentioned in the title of that document, the abstract of that document, the first couple of paragraphs of that document, repeatedly throughout that document, etc. For instance, if the object is mentioned numerous (e.g., more than five) times in the document, the method 500 may determine that the object plays a central role in the document. In some implementations, the number of times and how and where the object is mentioned across the documents of the news collection is used by the method 500 as evidence in determining the centrality of the object in the news collection and/or the documents of the news collection. The relevance determination module 222 may, in some implementations, perform the operations of blocks 540 and 542 and/or store relevance reflecting frequency and/or centrality of the objects for the news collections and/or the associated documents as relevance data 218 in the data store 210.

In blocks 544 to blocks 556, the method 500 may process the news collections for events that the objects described by the news collections are involved in and determine whether the events associated with the objects are pertinent based on an object-type of the objects. In some implementations, this object-type determination may be used by the method 500 to measure the relevance of each of the news collections with respect to the objects respectively described by the news collections.

For instance, in the illustrated implementation, the method 500 may determine 544 an object-type for the object, determine 546 a list of events as pertinent to the object-type, determine 548 one or more events in the news collection that involve the object, and then process 550 each of the events to determine their pertinence. In particular, in block 552, the method can determine whether the event is included in the list of predetermined pertinent events for the object-type associated with the object. If the event is not included in the list of pertinent events, the method 500 can identify 556 the event as non-pertinent. Alternatively, if the event is included in the list of pertinent events, the method 500 can identify 554 the event as pertinent. In some implementations, data reflecting the pertinence of the event may be recorded in the data store 210 as relevance data 218 for later reference.

The list of events may, in some implementations, be determined prior to run-time for prominent or popular object-types that historical data (e.g., search data, social network data, usage data, etc.) shows that users are interested in. For example, for object-types like celebrities, sports, medical conditions, entertainment events (e.g., concerts, movies, etc.), etc., the event generator 228 may generate and/or maintain a predetermined list of events for each of them that are particularly relevant. These lists of events may be used by the relevance determination module 222 to determine if a given documents and/or news collection is relevant to a given object based on the event(s) it describes in association with the object.

By way of further example, the event generator 228 may, for the object-type "medical conditions", predetermine a list of pertinent events considered central to objects belonging to the object-type including, for instance, new scientific advances associated with the condition, treatments for the condition, previously unknown side effects of treatments for the condition, population statistics about the condition, FDA recommendations for drugs for the condition, etc. Then, the relevance determination module 222, when evaluating the relevance of a given news collection (or document(s) thereof) to a given medical condition, e.g., cancer, may compare the events in the news collection to determine if those events match any of the events included in the list. As a further illustration, when processing a search for "cancer," any articles mentioning cancer in passing (e.g., article titled "11-year-old Oregon cancer survivor catches fire in freak hospital accident") may be excluded from the results returned to the user because cancer is not the central topic of those articles. This holds true even if the keyword "cancer" may be mentioned many times throughout the news collection/documents thereof.

Proceeding to block 558, in some implementations, the method 500 may perform event learning and/or optimization based on whether a list of events was determined in block 546 and/or new event-types were identified in blocks 548-556. For instance, if, for a given object or object-type, a list of predetermined pertinent events was not found in the data store 210, the method 500 may process the object to determine its type, determine what types of events users are interested in for that object-type, and create and store a list including those events for use during the current or a future iteration of the method 500. In some implementations, the manual intervention may be used by the method 500 to identify the relevant object-types. For instance, an administrator or employee-user may be prompted to identify and/or confirm which events are pertinent for a given object-type. In some implementations, the method 500 may process a knowledge base (e.g., encyclopedic information source) for pertinent events associated with a given object-type and use those events to create the list. The optimization and/or learning in block 558 may be performed by the event generator 228 in cooperation with the relevance determination module 222.

Next, the method 500 may determine 560 the significance of the object in the news collection based on object frequency (e.g., as determined in block 540), object centrality (e.g., as determined in block 542), and/or the number and/or pertinence of the events involving the object, as determined in blocks 546-556. The significance of the object in the news collection may be quantified (e.g., using an arbitrary numerical or categorical scoring system) and the method 500 may store its significance as relevance data 218 in the data store 210 for use in determining results for a news collection query for a given object. In some implementations, the relevance determination module 222 may perform the operation(s) in block 560 and manipulate the relevance data 218 in the data store 210.

Method 500 may then proceed to block 514 where it determines the relevance of the news collection relative to the object (e.g., object-news relevance) based on the overall relevance of the collection (e.g., as determined in block 524), the level of interest in the object (e.g., as determined in block 536), and/or the objects of significance in the collection (e.g., as determined in block 560). The relevance of the news collection relative to the object may also be quantified (e.g., using an arbitrary numerical or categorical scoring system) and the method 500 may store the relevance measurement as relevance data 218 in the data store 210 for use in determining results for a news collection query for a given object. In some implementations, the relevance determination module 222 may perform the operation(s) in block 514 and manipulate the relevance data 218 in the data store 210.

Upon processing 508 all of the objects determined in block 506, the method 500 returns to block 502 to process 502 any remaining news collections and then ends, repeats (upon receiving additional news collections), continues to other processing, etc.

FIGS. 6A-6B are graphic representations of example user interfaces 600 and 650 including example news summaries. With reference to FIG. 6A, user interface 600 includes a search box 602, the search button 604, a show/hide button 606, an activity graph 608, a filter region 610, a document result region 612, an overview region 614, and a scroll region 616. The search box 602 is configured to receive user input providing search criteria for the search query being submitted. Examples of search criteria may include keywords, boolean logic, phrases, audio (e.g., voice commands), images (e.g., search-by-image), etc. In the depicted example, the word "dog" was provided and the system returned a chronologically ordered set of unique results representing the latest and most salient documents from around the Internet, which are displayed in the document result region 612. Any number of documents may be displayed and the user may scroll the results, as indicated by the scroll region 616.

The activity graph 608 may be configured to show level of activity involved with the queried object/entity (e.g., as received by user in the search box 602) over a certain period of time. For instance, the level of activity may be based on number of user queries received for a given object during a particular period, number of news documents involving the object during a particular period, popularity of the object during a particular period, events reported for the object during a particular period, etc. In some instances, the activity graph 608 may serve as a navigational tool that may allow a user to choose a particular time period and view news documents associated with the queried object that were generated during that time period. As depicted in the figure, the activity graph 608 shows the most activity happening in the year 2010 and the user may choose this year to view news summary associated with "dog" during that year. In some implementations, the news summary may include hidden summary regions expandable by the user upon selection to view the most relevant news articles in a given news collection and/or to view a summary/abstract of a given news article. Visibility of these summary regions may be toggled by the user using the show/hide button 606.

The filter region 610 includes a set of filter options for refining and/or expanding the search. By default, the top 10 results for "Dog" are displayed in the document result region 612, however any arbitrary number of results (e.g., 20, 50, etc.) may be displayed by selecting a corresponding filter option in the filter region 610. Additionally or alternatively, the results may be limited by time (e.g., any time, past 3, 6, 9, 12, etc., months, a custom range, etc.). Other options, including, for example, further refinement by keyword, toggling display of various entities on and off (in the case of a search including more than one entity (e.g., "Dog" and "Cat")), etc., are also contemplated and may be included. The overview region 614 may include a general description of the queried object(s). For instance, in the depicted example a general description of what constitutes a Dog is provided. When generating the summary depicted in the user interface 600, the news summary generator 226 may retrieve and insert the contents of the overview region 614 from a knowledge graph (e.g., an encyclopedic database).

With reference to FIG. 6B, user interface 650 includes a set of search results for Anna M., a celebrity and member of the royal family. Since, Anna M. is expected to soon give birth to an heir and was wed to Prince Peter B. the previous year, the results displayed in the document result region 612 include articles related to these events. In this example, the system 100 can predetermine events like weddings, births, social activities, health, etc., as pertinent to celebrities and include news collections/documents therefrom based at least in part thereon in the results, as shown. In further examples, relevance indicia including the overall relevance of the news collections, the level of interest in the object by users, the significance of the object in the news collections, etc., as discussed elsewhere herein, may be used to determine which collections and/or documents should be included in the result set.

In some implementations, the system 100 may provide a suggestive search dropdown menu 622 that includes a plurality of suggested search options 620 for the user based on the input provided in search box 602. As with the documents returned for a search query, the suggested search options 620 may, in some instances, be generated by the suggestive search module 230 based on the relevance of the news collections, as determined by the system 100. For example, for celebrities, weddings, clothes, accessories, etc., are events that users are generally highly interested in viewing content about, and the suggestive search module 230 may generate search suggestions based on the relevance of these events and provide the suggestions to the client device 106 of the user 112 for display at query time (e.g., via the dropdown menu 622) to facilitate the user with the search being performed. Other relevance indicia may additionally or alternatively be used to generate the search suggestions using the operations of at least the methods 300 and 500 discussed herein. The user interface 650 also includes many of the same items as user interface 600 and the description of those items will not be repeated here.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the present disclosure is not described with reference to any particular programming language. It will be appreciated that a variety of programming languages may be used to implement the teachings of the disclosure as described herein.

The foregoing description has been presented for the purposes of illustration and description. It is not intended to be exhaustive or to limit the present disclosure to the precise form disclosed. Many modifications and variations are possible in light of the above teaching. It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   aggregating news documents from one or more news sources;
   grouping the news documents into a plurality of news collections, each of the plurality of news collections including a sub-set of the news documents having related content;
   determining objects described by the plurality of news collections, the objects collectively forming a set of objects;
   determining an overall relevance of each of the plurality of news collections by determining a number of news sources in each of the plurality of news collections reporting on a related topic;
   determining a level of interest in the objects described by the plurality of news collections by determining a number of other news collections mentioning the objects and a number of search queries searching for information about the objects during a predetermined timeframe;
   determining a significance of the objects in the plurality of news collections by determining a number of times that the objects appear in titles of the news documents of the plurality of news collections, a centrality of the objects in the news documents of the plurality of news collections, the centrality of the objects being based on where the objects are mentioned in a body of the news documents, and a pertinence of events described by the plurality of news collections involving the objects;
   determining a relevance of each of the plurality of news collections with respect to the objects respectively described by the plurality of news collections, the relevance being based on the overall relevance of each of the plurality of news collections, the level of interest in the objects described by the plurality of news collections, and the significance of the objects in the plurality of news collections; and
   determining one or more news collections from the plurality of news collections to be associated with a first object included in the set of objects based on the relevance of the one or more news collections to the first object.

2. The computer-implemented method of claim 1, further comprising:

receiving a query for a chronological summary of news documents about the first object;

determining a set of news documents from the one or more news collections that are associated with the first object;

generating the chronological summary based on the set of news documents; and providing the chronological news summary for presentation to a user.

3. The computer-implemented method of claim 1, further comprising:

processing the plurality of news collections for events that the objects respectively described by the plurality of news collections are involved in, wherein measuring the relevance of each of the plurality of news collections with respect to the objects respectively described by the plurality of news collections includes determining whether the events associated with the objects are pertinent based on object-types of the objects.

4. The computer-implemented method of claim 3, further comprising:

determining the object-types for the objects; and determining a list of pertinent events for each of the object-types, wherein determining whether the events associated with the objects are pertinent based on the object-types of the objects includes determining, for each of the events in the plurality of news collections, the object involved in that event, an object-type for the object, and whether that event is included the list of pertinent events for the object-type.

5. The computer-implemented method of claim 1, wherein the first object includes one or more of an entity, an event, and a topic.

6. The computer-implemented method of claim 1, wherein determining the relevance of each of the plurality of news collections with respect to the objects respectively described by the plurality of news collections includes determining the relevance of each of the plurality of news collections with respect to the objects respectively described by the plurality of news collections at regular intervals.

7. The computer-implemented method of claim 1, wherein determining the overall relevance of each of the plurality of news collections includes determining a level of user interest in each of the plurality of news collections, and determining the level of interest in the objects respectively described by the plurality of news collections includes determining a trend for each of the objects on one or more social networks during the predetermined timeframe.

8. A computer program product comprising a non-transitory computer usable medium including a computer readable program, wherein the computer readable program when executed on a computer causes the computer to:

aggregate news documents from one or more news sources;

group the news documents into a plurality of news collections, each of the plurality of news collections including a sub-set of the news documents having related content;

determine objects described by the plurality of news collections, the objects collectively forming a set of objects;

determine an overall relevance of each of the plurality of news collections by determining a number of news sources in each of the plurality of news collections reporting on a related topic;

determine a level of interest in the objects described by the plurality of news collections by determining a number of other news collections mentioning the objects and a number of search queries searching for information about the objects during a predetermined timeframe;

determine a significance of the objects in the plurality of news collections by determining a number of times that the objects appear in titles of the news documents of the plurality of news collections, a centrality of the objects in the news documents of the plurality of news collections, the centrality of the objects being based on where the objects are mentioned in a body of the news documents, and a pertinence of events described by the plurality of news collections involving the objects;

determine a relevance of each of the plurality of news collections with respect to the objects respectively described by the plurality of news collections, the relevance being based on the overall relevance of each of the plurality of news collections, the level of interest in the objects described by the plurality of news collections, and the significance of the objects in the plurality of news collections; and determine one or more news collections from the plurality of news collections to be associated with a first object included in the set of objects based on the relevance of the one or more news collections to the first object.

9. The computer program product of claim 8, wherein the computer readable program, when executed on the computer, further causes the computer to:

receive a query for a chronological summary of news documents about the first object;

determine a set of news documents from the one or more news collections that are associated with the first object;

generate the chronological summary based on the set of news documents; and provide the chronological news summary for presentation to a user.

10. The computer program product of claim 8, wherein the computer readable program, when executed on the computer, further causes the computer to:

process the plurality of news collections for events that the objects respectively described by the plurality of news collections are involved in, wherein to measure the relevance of each of the plurality of news collections with respect to the objects respectively described by the plurality of news collections includes determining whether the events associated with the objects are pertinent based on object-types of the objects.

11. The computer program product of claim 10, wherein the computer readable program, when executed on the computer, further causes the computer to:

determine the object-types for the objects; and determine a list of pertinent events for each of the object-types, wherein to determine whether the events associated with the objects are pertinent based on the object-types of the objects includes determining, for each of the events in the plurality of news collections, the object involved in that event, an object-type for the object, and whether that event is included the list of pertinent events for the object-type.

12. The computer program product of claim 8, wherein the first object includes one or more of an entity, an event, and a topic.

13. The computer program product of claim 8, wherein to determine the relevance of each of the plurality of news collections with respect to the objects respectively described by the plurality of news collections includes determining the relevance of each of the plurality of news collections with respect to the objects respectively described by the plurality of news collections at regular intervals.

14. The computer program product of claim 8, wherein
to determine the overall relevance of each of the plurality of news collections includes determining a level of user interest in each of the plurality of news collections, and
to determine the level of interest in the objects respectively described by the plurality of news collections includes determining a trend for each of the objects on one or more social networks during the predetermined timeframe.

15. A system comprising:
a processor;
a memory storing instructions that, when executed by the processor, cause the system to:
aggregate news documents from one or more news sources;
group the news documents into a plurality of news collections, each of the news collections including a sub-set of the news documents having related content;
determine objects described by the plurality of news collections, the objects collectively forming a set of objects;
determine an overall relevance of each of the plurality of news collections by determining a number of news sources in each of the plurality of news collections reporting on a related topic;
determine a level of interest in the objects described by the plurality of news collections by determining a number of other news collections mentioning the objects and a number of search queries searching for information about the objects during a predetermined timeframe;
determine a significance of the objects in the plurality of news collections by determining a number of times that the objects appear in titles of the news documents of the plurality of news collections, a centrality of the objects in the news documents of the plurality of news collections, the centrality of the objects being based on where the objects are mentioned in a body of the news documents and a pertinence of events described by the plurality of news collections involving the objects;
determine a relevance of each of the plurality of news collections with respect to the objects respectively described by the plurality of news collections, the relevance being based on the overall relevance of each of the plurality of news collections, the level of interest in the objects described by the plurality of news collections, and the significance of the objects in the plurality of news collections; and
determine one or more news collections from the plurality of news collections to be associated with a first object included in the set of objects based on the relevance of the one or more news collections to the first object.

16. The system of claim 15, wherein the instructions, when executed, further cause the system to:
receive a query for a chronological summary of news documents about the first object;
determine a set of news documents from the one or more news collections that are associated with the first object;
generate the chronological summary based on the set of news documents; and
provide the chronological news summary for presentation to a user.

17. The system of claim 15, wherein the instructions, when executed, further cause the system to:
process the plurality of news collections for events that the objects respectively described by the plurality of news collections are involved in, wherein to measure the relevance of each of the plurality of news collections with respect to the objects respectively described by the plurality of news collections includes determining whether the events associated with the objects are pertinent based on object-types of the objects.

18. The system of claim 17, wherein the instructions, when executed, further cause the system to:
determine the object-types for the objects; and
determine a list of pertinent events for each of the object-types, wherein to determine whether the events associated with the objects are pertinent based on the object-types of the objects includes determining, for each of the events in the plurality of news collections, the object involved in that event, an object-type for the object, and whether that event is included the list of pertinent events for the object-type.

19. The system of claim 15, wherein the first object includes one or more of an entity, an event, and a topic.

20. The system of claim 15, wherein to determine the relevance of each of the plurality of news collections with respect to the objects respectively described by the plurality of news collections includes determining the relevance of each of the plurality of news collections with respect to the objects respectively described by the plurality of news collections at regular intervals.

21. The system of claim 15, wherein
to determine the overall relevance of each of the plurality of news collections includes determining a level of user interest in each of the plurality of news collections, and
to determine the level of interest in the objects respectively described by the plurality of news collections includes determining a trend for each of the objects on one or more social networks during the predetermined timeframe.

* * * * *